United States Patent
Edwards et al.

(10) Patent No.: US 9,611,897 B2
(45) Date of Patent: Apr. 4, 2017

(54) GREASE RETENTION ASSEMBLY FOR A JOINT OF A VEHICLE DRIVE SHAFT

(71) Applicant: NTN Bearing Corporation of America, Mt. Prospect, IL (US)

(72) Inventors: Krystil Elizabeth Edwards, Livonia, MI (US); Ihor R. Maksymiak, Sylvania, OH (US); Jon R. Barrett, Howell, MI (US)

(73) Assignee: NTN Bearing Corporation of America, Mt. Prospect, IL (US)

( * ) Notice: Subject to any disclaimer, the term of this patent is extended or adjusted under 35 U.S.C. 154(b) by 0 days.

(21) Appl. No.: 14/681,391

(22) Filed: Apr. 8, 2015

(65) Prior Publication Data

US 2016/0298694 A1    Oct. 13, 2016

(51) Int. Cl.
*F16D 3/84* (2006.01)
*F16D 3/223* (2011.01)

(52) U.S. Cl.
CPC ............ *F16D 3/843* (2013.01); *F16D 3/223* (2013.01); *F16D 2003/846* (2013.01); *F16D 2300/06* (2013.01); *Y10S 464/906* (2013.01); *Y10T 464/10* (2015.01)

(58) Field of Classification Search
CPC .... F16D 3/24; F16D 2300/06; Y10S 464/906; Y10T 464/10
USPC ............ 464/15, 17, 146, 906; 403/332, 375, 403/DIG. 3; 138/89; 137/68.19, 68.23
See application file for complete search history.

(56) References Cited

U.S. PATENT DOCUMENTS

| | | | |
|---|---|---|---|
| 2,994,731 A | 8/1961 | Buskirk et al. | |
| 3,596,808 A | 8/1971 | Corsette | |
| 4,424,004 A * | 1/1984 | Hiskes | F01D 5/06 138/89 |
| 5,848,616 A * | 12/1998 | Vogel | B23P 11/00 138/89 |
| 6,530,843 B2 | 3/2003 | Miller et al. | |
| 6,981,919 B2 | 1/2006 | Sugiyama et al. | |
| 6,988,949 B2 | 1/2006 | Wang | |
| 7,226,360 B2 | 6/2007 | Lyon et al. | |
| 7,297,067 B1 | 11/2007 | Meyer | |
| 8,197,346 B2 * | 6/2012 | Miller | F16D 3/843 464/17 |
| 8,680,984 B2 * | 3/2014 | Rosen | F17D 5/06 |

(Continued)

OTHER PUBLICATIONS

PCT International Search Report—May 27, 2016.

*Primary Examiner* — Gregory Binda
(74) *Attorney, Agent, or Firm* — Brinks Gilson & Lione

(57) ABSTRACT

A grease-retention assembly for a drive shaft assembly with a tubular shaft connected to a joint includes an outer race and a cap for grease retention and venting arranged in an inside diameter section of the outer race. The cap includes an outer annular rim with an annular indentation. The outer race includes a radial abutment shoulder extending radially inward and defining an axial end position of the rim of the cap, and a radial annular rib extending from the inside diameter section. The rib partially fills the annular indentation of the rim when the cap is in the axial end position. The cap further includes a central portion with a hollow air cavity extending across the cap between two radially extending walls, an axial hole through one of the two radially extending walls, and a radial annular groove communicating with the air cavity.

19 Claims, 6 Drawing Sheets

(56) References Cited

U.S. PATENT DOCUMENTS 9,028,332 B2 * 5/2015 Ketchel .................. F16D 3/227
                                                                                      464/15
2014/0206464 A1    7/2014 Ketchel et al.

* cited by examiner

GREASE RETENTION ASSEMBLY FOR A JOINT OF A VEHICLE DRIVE SHAFT

TECHNICAL FIELD OF THE INVENTION

The present invention relates to a grease retention assembly for a joint of a vehicle drive shaft, such as a constant velocity joint (CVJ) of a propeller shaft, and a joint assembly including the grease retention assembly.

BACKGROUND OF THE INVENTION

For safety reasons, propeller shaft assemblies for motor vehicles which are oriented longitudinally with CVJs are typically designed with a crash function that allows the shaft assembly to collapse longitudinally in the event of a frontal impact. These assemblies also need proper sealing against lubricant leakage and isolation from external water and dirt on the one hand and a venting system on the other hand. All these requirements make the construction of a propeller shaft assembly complex.

SUMMARY OF THE INVENTION

According to one aspect of the present invention, a grease-retention assembly includes a grease retention and vent cap that has an outer annular rim positioned in an inside diameter section of an outer race of a CVJ. The rim has an annular indentation. The outer race includes a radial abutment shoulder extending radially inward and defining an axial end position of the rim of the cap, and a radial annular rib extending from the inside diameter section. The rib partially fills the annular indentation of the rim when the cap is in the axial end position. The interaction between the rib and the annular indentation in the rim provides secure retention of the cap during normal vehicle operation and CVJ assembly, but allows for the CVJ components to displace the cap once a predetermined force is exceeded.

The annular indentation of the rim may have a semi-elliptical or semi-circular cross-section. The rib may have a radially innermost ridge engaging the annular indentation of the rim in an interference fit. For example, the rib may have an asymmetrical profile with the first axial portion forming a ramp and a second axial portion opposite the first axial portion forming a stop surface, with the stop surface forming a steeper angle with respect to an axial direction than the ramp.

For enhancing the sealing properties of the rim, the ramp may form a convex arc with a curvature corresponding to a partial curvature of the annular groove.

In an arrangement of the ramp on the annular rib remote from the abutment surface, the annular rib can snap into the annular indentation upon insertion of the cap into the outer race.

According to another aspect of the present invention, the cap may further include a central portion with a hollow air cavity extending across the cap between two radially extending walls, an axial hole through one of the two radially extending walls, and a radial annular groove communicating with the air cavity.

The cap may have an arrangement of vent ducts leading from the internal components of the CVJ to a radial annular groove surrounding the entire circumference of the cap. From there, a connection to the atmosphere may be established by at least one radial bore in the outer race of the CVJ in the axial area of the annular groove at any angular position on the tubular shaft. The invention thus encompasses both a venting system incorporated into the cap and a crash feature for a propeller shaft assembly, eliminating the need for two separate systems for such features.

Grease is retained inside the outer race of the CVJ in the propeller shaft assembly by providing a vent hole for communication with the interior components of the CVJ in the axial center of the cap, thereby ensuring that the vent hole is never at the bottom of the tubular shaft, regardless of the orientation of the cap. The rim thus forms a seal along the entire circumference of the cap.

In this configuration, the cap will act as a venting system, provides grease retention for the CVJ, and allows for crash optimization.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

The figures of the drawings are provided for purely illustrative purposes and are not intended to limit the scope of the invention.

Figure 1:
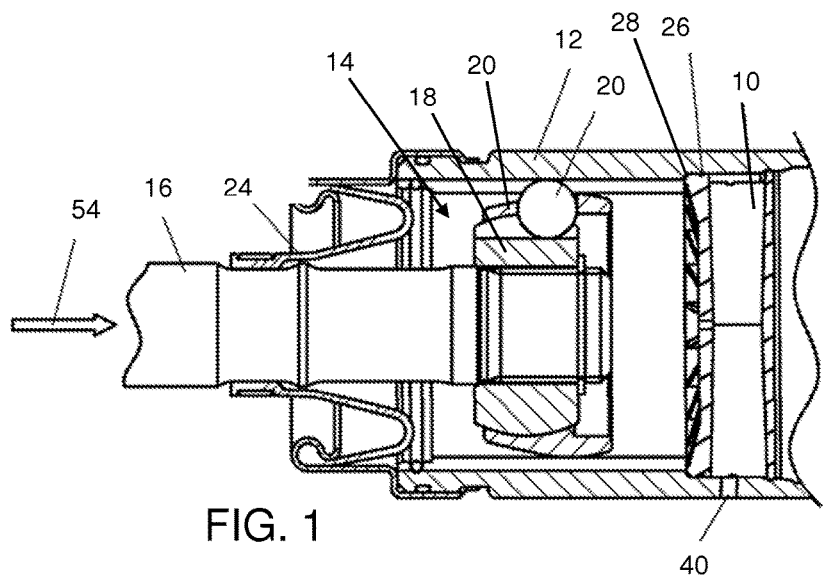
FIG. 1 is a radial view of a propeller shaft assembly in an axial cross-sectional plane, showing the components thereof during normal vehicle operation.

FIG. 1 depicts a cap 10 used within a propeller shaft assembly during normal vehicle operation. The cap 10 is pressed inside an outer race 12 of a propeller shaft CVJ. Internal joint components of the CVJ are retained inside the outer race 12 and sealed by the cap 10.

The cap 10 separates the internal joint components 14 of a CVJ, such as stub shaft 16, inner race 18, ball cage 20 and balls from a tubular shaft portion of the propeller shaft (not shown in this drawing figure). A dust boot 24 seals the gap between the stub shaft 16 and the outer race 12 to prevent contamination.

The cap 10 has an annular rim 26 that is pressed into a recessed inside diameter section of the outer race 12 of the propeller shaft CVJ and axially abuts a radial abutment shoulder 28 extending inward from the inside diameter section in the shown assembled position. Retention of the rim 26 in the outer race 12 is accomplished by a slight radial annular indentation 30 in the rim 26 placed on an annular rib 60 in the outer race 12. The annular indentation 30 of the rim 26 may have a semi-elliptical or semi-circular cross-section.

Axially adjacent to the rim 26 is an axial area forming a hollow air cavity 32 that extends radially across the entire width of the cap 10 between a first radial wall 34 proximate the internal joint components 14 and a second radial wall 36 remote from the internal joint components 14. The hollow air cavity 32 is open at both radial ends and terminates in an annular groove 38 that extends around the entire circumference of the cap 10. At least one radial air vent bore 40 is arranged in the outer race 12 in an area that axially overlaps with the hollow air cavity 32, preferably in an axial location coinciding with the annular groove 38. Further details of the hollow air cavity 32 will be described in connection with FIGS. 4 through 9 below.

The cap 10 retains grease inside the outer race 12 due to the sealing properties of the rim 26, while allowing air to vent to the outside. For allowing venting, an axial vent hole 42 is located centrally in the first radial wall 34. The vent hole 42 establishes a fluid communication to the hollow air cavity 32 from the interior space of the outer race 12 that accommodates the internal joint components 14. Due to the radially central location of the vent hole 42, the vent hole 42 is always elevated from the bottom of the outer race 12, regardless of the angular orientation of the cap 10.

Vented air, on the other hand, is allowed to pass into the hollow air cavity 32 and through the radially open ends of the hollow air cavity 32 into the radial annular groove 38 that runs around the entire circumference of the cap 10. The air then passes through at least one air vent bore 40 of the outer race 12 to the atmosphere. This allows atmospheric pressure venting and prevents the development of pressure differentials between the area of the internal joint components 14 and atmosphere, which could otherwise lead to the introduction of contaminants that in turn can degrade the service life of the CVJ.

Figures 2, 3:
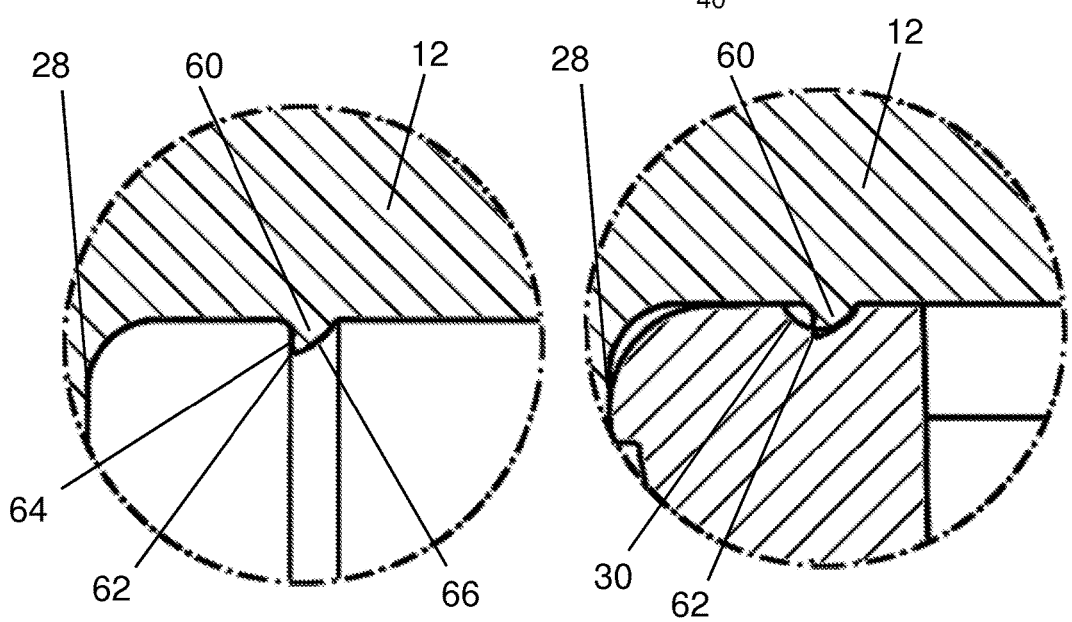
FIG. 2 is a cross-sectional detail view of an outer race as part of the propeller shaft assembly shown in FIG. 1.
FIG. 3 is a cross-sectional detail view of the outer race of FIG. 1 in the same view as FIG. 2, holding a grease retention and vent cap.

FIGS. 2 and 3 show the annular rib 60 of the outer race 12 and the annular indentation 30 of the rim 26 of the cap 10 in closer detail. FIG. 2 shows details of the outer race 12 without the cap 10 being inserted into the outer race 12. The annular rib 60 has a profile that resembles a shark fin in that it has a ridge 62 separating two sides with different slope angles.

On the side facing the internal joint components 14, the rib 60 protrudes from the outer race 12 at an angle approximately equal to a right angle. This side of the rib 60 is a stop surface 64 for resisting a displacement of the cap 10 away from the assembled position. The exact angle of the stop surface 64 is determined by the physical properties and interactions of the assembled CVJ and further by the elastic and plastic deformation properties of the cap 10. For example, if the cap 10 is made of a hard material with a low degree of elasticity, the protrusion angle of the stop surface 64 may be smaller, while a softer or more elastic cap 10 may require a right angle or an obtuse angle (resulting in a concave structure of the outer race profile). Thus the angle of the stop surface 64 is selected to allow the cap 10 to move out of its assembled position at a predetermined force exerted on the cap 10 by the internal joint components 14 in the event of a crash.

On the side remote from the radial shoulder 28, the rib 60 has a ramp-like slope. The stop surface 64 forms a steeper angle with respect to an axial direction than the ramp. The slope can be formed in part by an arc 66 with a curvature matching the annular indentation 30 of the rim 26 to ease assembly and enhance sealing between the rim 26 and the outer race 12. The arc 66 also has a ramp function during the insertion of the cap 10 into the outer race 12. The slope of the arc 66 allows the rim 26 to pass the rib 60 by elastic deformation until the rib 60 snaps into the annular indentation 30. Near the ridge 62, the arc 66 may be slightly straightened to facilitate an interference fit with the annular indentation 30 of the rim 26 as shown in FIG. 3. The ridge 62 of the rib 60 increases retention during normal operation.

FIG. 3 shows the same detail as FIG. 2, but with the cap 10 in the assembled position. The axial end of the rim 26 that faces the internal joint components 14 rests on the radial shoulder 28 of the outer race 12 that determines the axial location of the cap 10 in the shown assembled position of the CVJ. The annular rib 60 of the outer race 12 and the annular indentation 30 of the rim 26 are axially aligned, and the profile of the arc 66 of the rib 60 aligns with a portion of the annular indentation 30 for enhanced sealing of the circumference of the cap 10 against the outer race 12.

Near the ridge 62 of the rib 60, the profiles of the rib 60 and of the indentation 30 interfere with each other so that the ridge 62 of the rib 60 digs itself into the bottom of the indentation 30 and secures the cap 10 in the assembled position via an interference fit. Before the cap 10 is placed in the assembled position, the bottom of the indentation 30 defines a local diameter of the cap that is greater than the diameter of the ridge 62. As the outer race 12 is made of metal and the cap 10 is made of plastic, the ridge 62 of the rib 60 plastically deforms the bottom of the indentation 30.

In FIGS. 4-9, further details of the cap 10 are shown. Axes x, y, and z of a virtual coordinate system are indicated in the drawings to illustrate the respective perspectives of the individual drawing figures.

The hollow air cavity 32 in the cap 10 has a volume of a sufficient size to ensure that no water will enter the space of the internal joint components 14 during an event in which the CVJ is hot and then cooled quickly, for example by water submersion during operation of the associated motor vehicle. The cooling effect of the water causes air inside the outer race to contract and to create a vacuum. In such a situation, the rapid quenching can cause water to be sucked into the cap 10. By providing sufficient volume in the internal hollow air cavity 32 of the cap 10 that any ingressed water level will remain below the axial vent hole 42, the sucked-in water will be retained in the hollow air cavity 32 and will not reach the internal joint components 14 through the vent hole 42. The exact volume of the hollow air cavity 32 depends on anticipated temperature differences and on physical properties of the propeller shaft assembly, such as enclosed air volume. The central location of the vent hole 42 ensures that the vent hole 42 is never at the bottom of the hollow air cavity 32, regardless of the angular orientation of the cap 10 inside the propeller shaft assembly. Therefore, any water accumulated at the bottom of the hollow air cavity 32 cannot flow into the area of the internal joint components 14. Instead, the water may escape to the atmosphere through the radial vent bores 40 in the outer race 12 if one of the vent bores 40 is arranged near the bottom of the outer race 12. Providing a further vent bore 40 at an elevated position ensures drainage of the ingressed water by providing a path for air that equalizes the pressure inside the hollow air cavity 32 during drainage.

Figure 4:
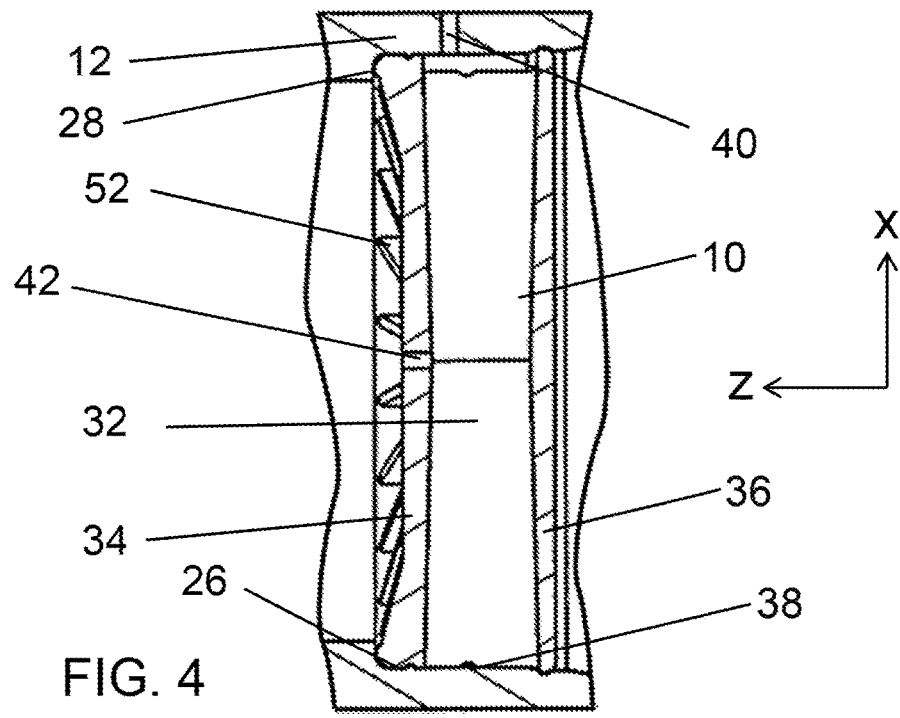
FIG. 4 is a radial detail view of the outer race and the grease retention and vent cap of FIG. 1 in an axial cross-sectional plane.
Figure 5:
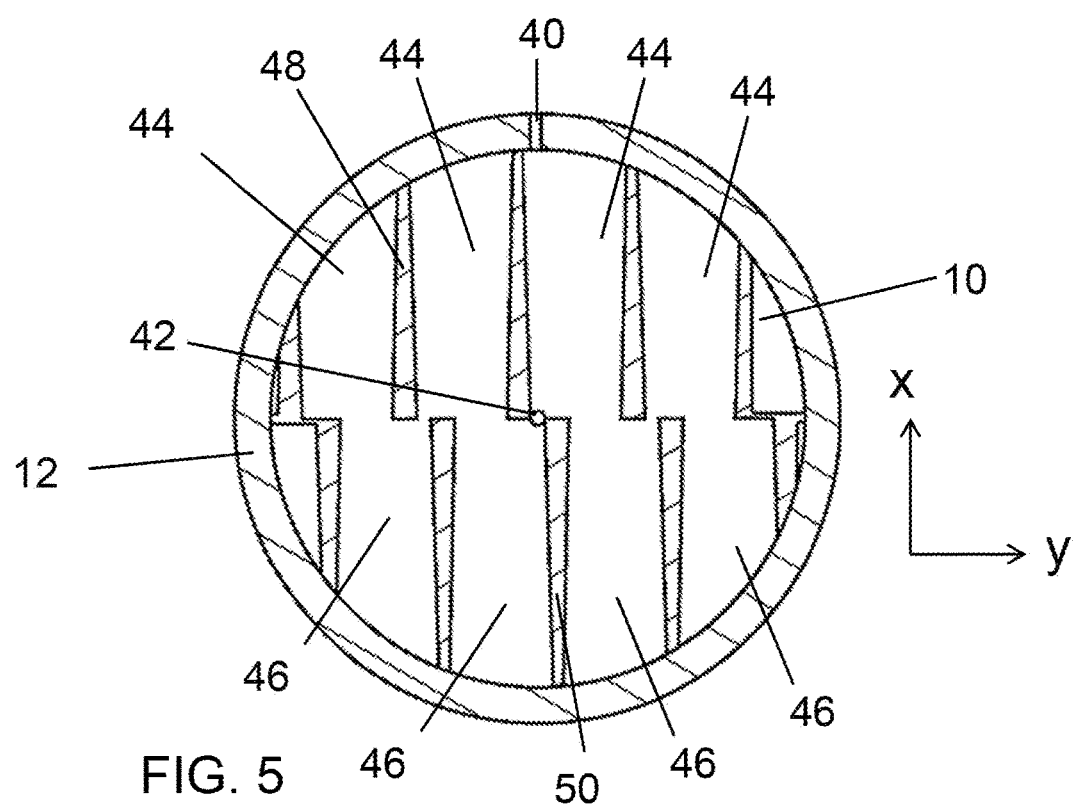
FIG. 5 is an axial detail view of the outer race and the grease retention and vent cap of Fig. in a radial cross-sectional plane.
Figure 8:
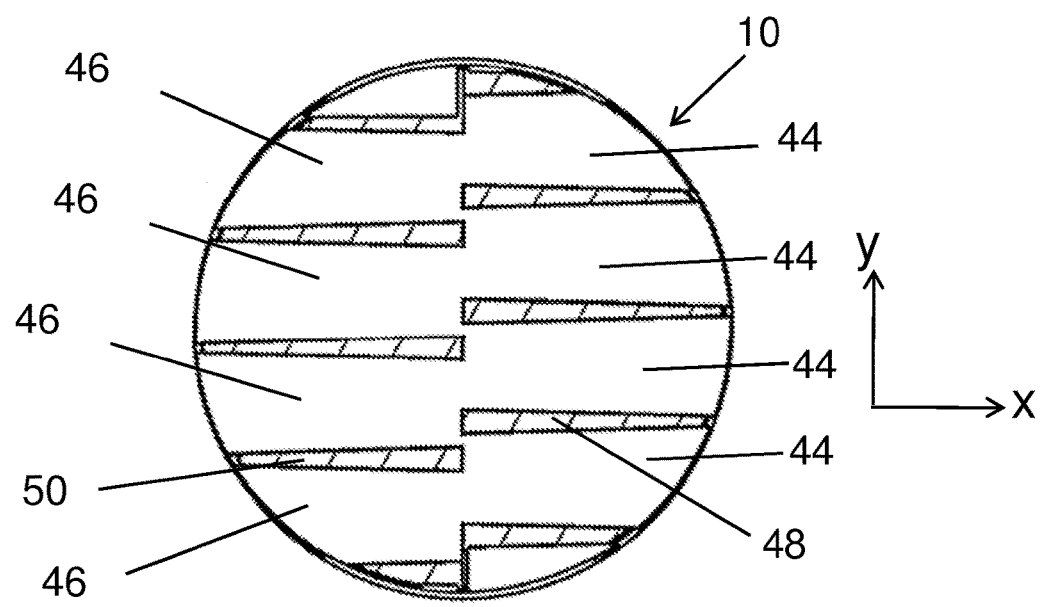
FIG. 8 is a cross-sectional view of the grease retention and vent cap in the same radial plane as in FIG. 5, viewed in the opposite direction.
Figure 9:
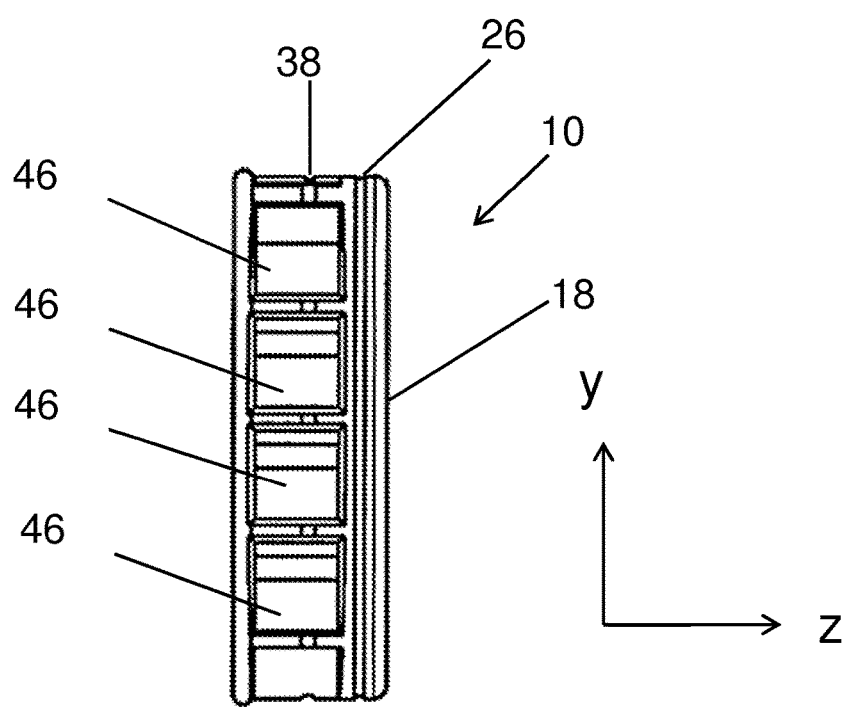
FIG. 9 is a side view of the grease retention and vent cap.

Axially adjacent to the rim 26 is an axial area forming the hollow air cavity 32 as shown in FIG. 4. Inside the hollow air cavity 32, two sets of hollow channels 44 and 46 extend parallel across half of the radial width of the cap 10 as shown in FIGS. 5 and 8. The hollow channels of each set 44 and 46 are separated from each other by a set 48 and 50 of parallel walls arranged in such a way that the radial center of the cap 10 is not obstructed by a wall as shown in FIG. 5. The first set 48 of parallel walls is laterally offset from the second set 50 of parallel walls. Both sets 48 and 50 of parallel walls end at an axially extending center plane of the cap 10. Due to the lateral offset of the two sets 48 and 50 of parallel walls, the two sets 44 and 46 of hollow channels are in communication with each other inside the hollow air cavity 32 and form a labyrinth for ingressed water. The hollow channels 44 and 46 are open at their outer radial ends. A radial annular groove 38 in end portions of the walls 48 and 50 extends around the entire circumference of the cap 10. The axial vent hole 42 is located centrally in the first radially extending wall 34 that bounds the hollow channels at the axial end near the rim 26. The vent hole 42 establishes an axial communication to the labyrinth of hollow channels 44 and 46.

Figure 6:
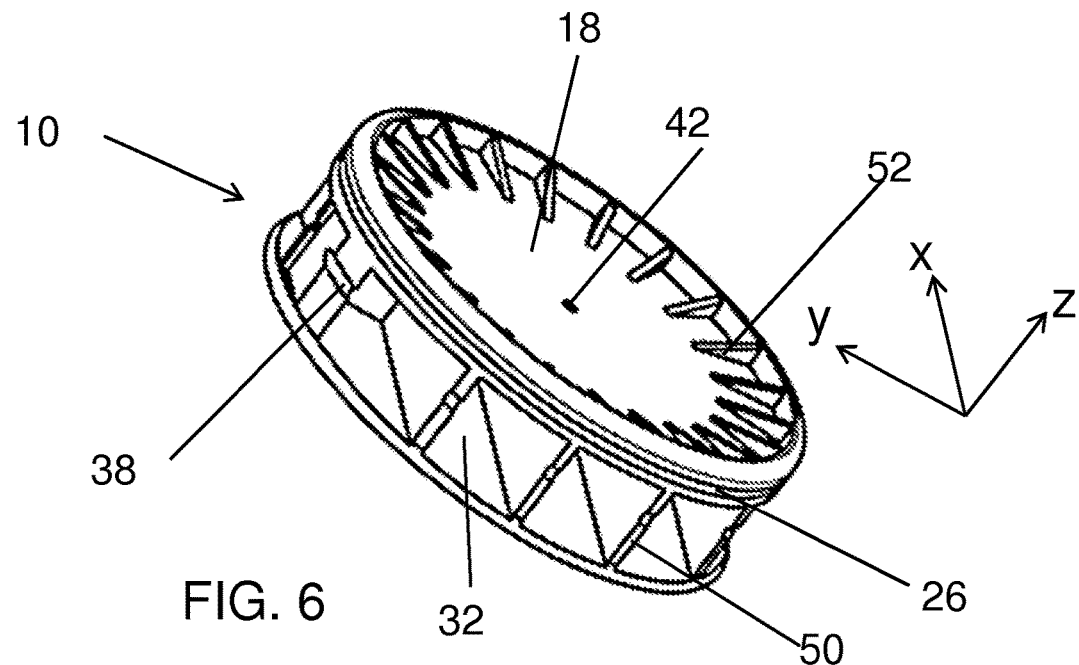
FIG. 6 depicts the grease retention and vent cap of FIGS. 4 and 5 in a first perspective view showing one of two faces of the cap.

As shown in closer detail in FIG. 6, reinforcing webs 52 supporting the rim 26 may be disposed on the face of the first radial wall 34. The thickness as well as radial and axial dimensions of these webs 52 can be dimensioned to meet specifications regarding a threshold force 54 along the arrow (shown in subsequent figures) required to separate the rim 26 from the central portion of the cap 10 or to disintegrate the rim 26 as explained in more detail in connection with FIGS. 10 through 12.

Figure 7:
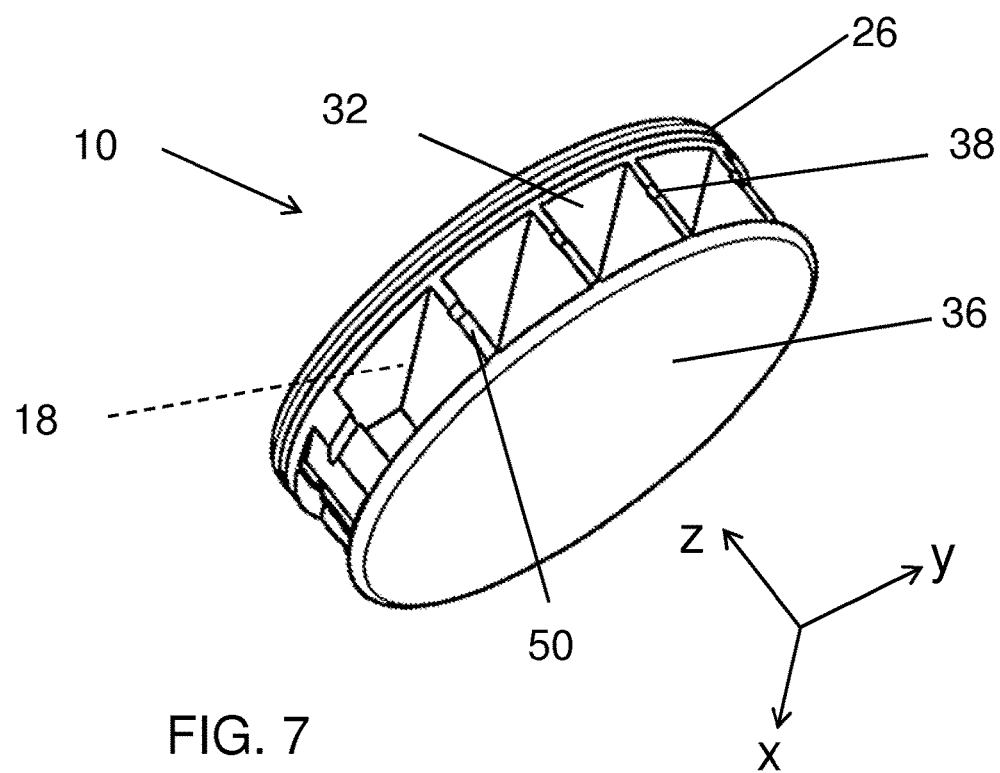
FIG. 7 depicts the grease retention and vent cap of FIGS. 4 and 5 in a second perspective view showing the other one of the two faces of the cap.

As shown in FIG. 7, the second radial wall 36 of the cap 10 may have a simple planar surface. The second radial wall 36 has an outer diameter similar to, but not greater than, the outer diameter of the rim 26.

Figure 10:
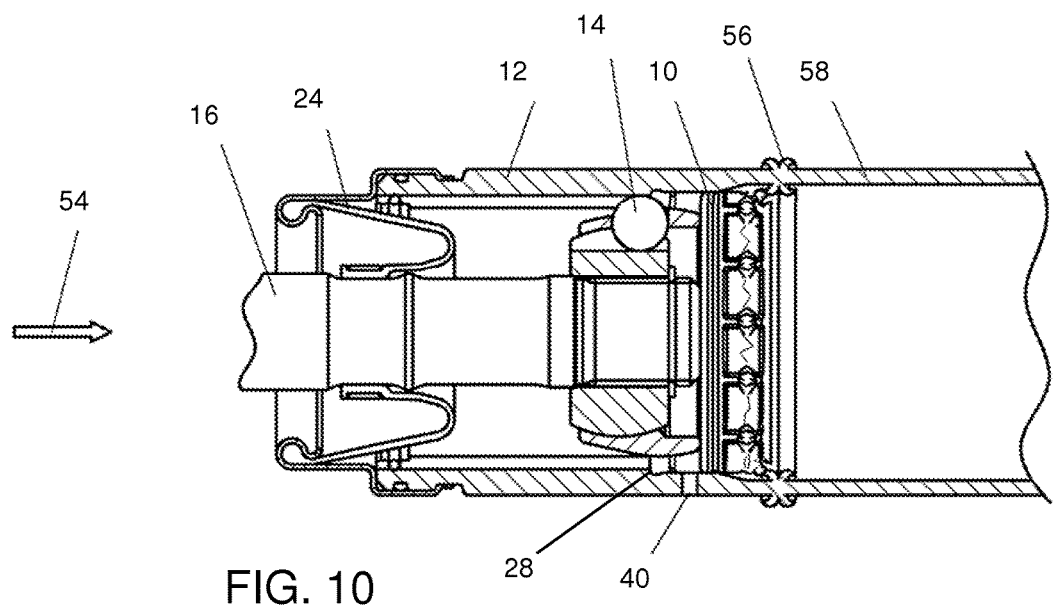
FIG. 10 depicts the grease retention and vent cap of FIG. 6 inside a first type of propeller shaft assembly during a vehicle crash.
Figure 11:
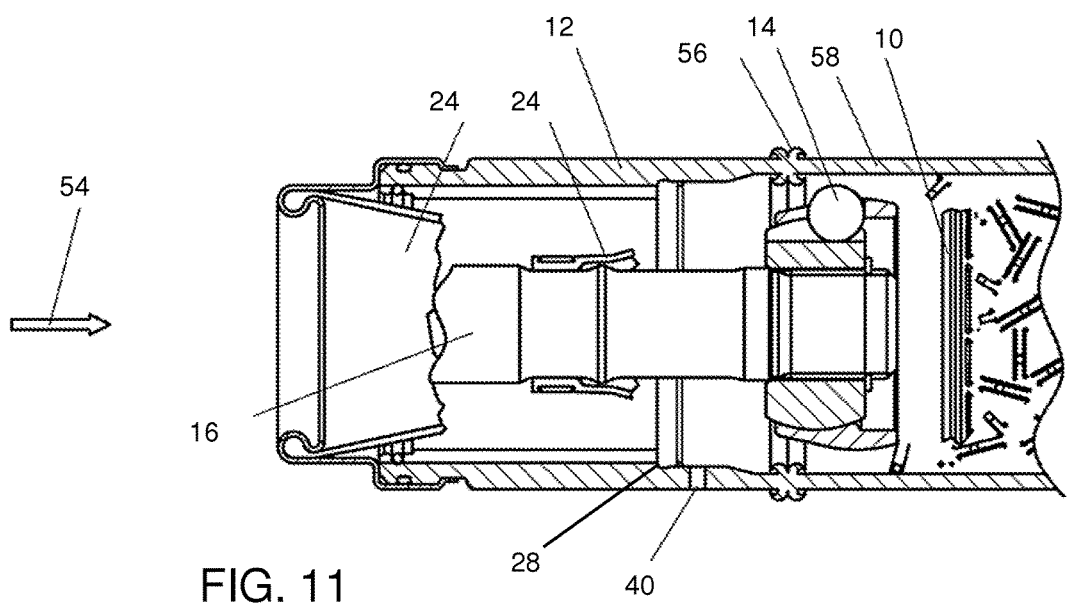
FIG. 11 depicts the grease retention and vent cap of FIG. 6 inside the first type of propeller shaft assembly after a vehicle crash.
Figure 12:
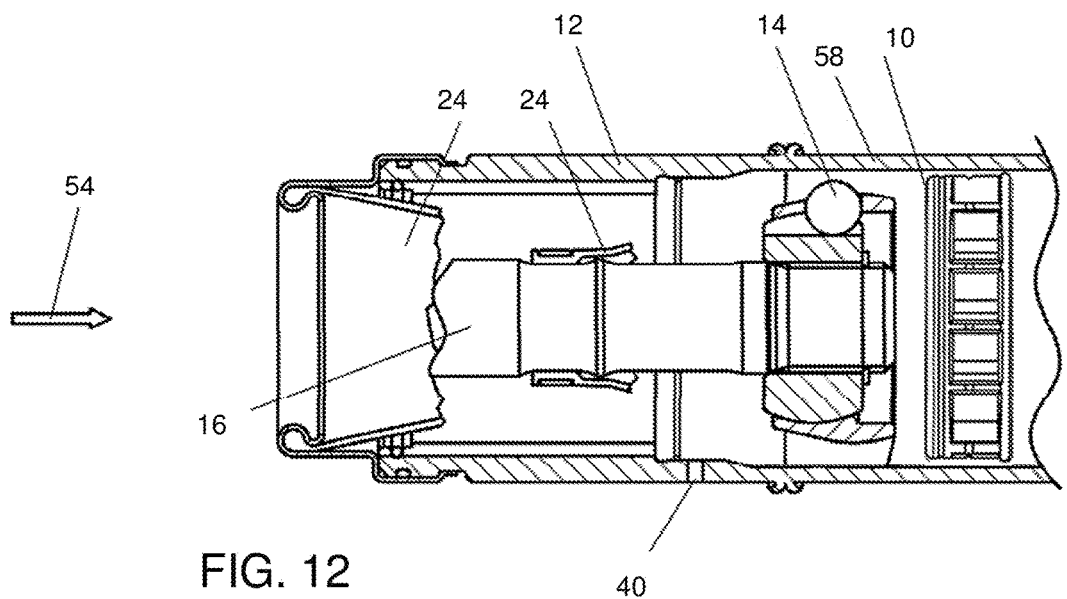
FIG. 12 depicts the grease retention and vent cap of FIGS. 6 through 9 inside a second type of propeller shaft assembly after a vehicle crash.

Now referring to FIGS. 10-12, the cap 10 may be used in a CVJ outer race 12 that is joined to a tubular propeller shaft 58 by welding.

In a first example of a propeller shaft assembly as shown in FIGS. 10 and 11, the tubular propeller shaft 58 of the propeller shaft assembly is connected to the outer race 12 via a weld 56. The weld 56 as shown has a bead that extends both radially outwardly and also inwardly from the inside diameter of shaft, which is typical in a friction welding process.

To prevent interference with an axial movement of the cap 10, machining of the bead of weld 56 would be required. In order to still allow for a longitudinal collapse during a frontal impact without interior machining of the weld 56, the cap 10 is configured to withstand axial displacement of the internal joint components 14 in direction only up to a limited extent.

FIG. 10 depicts the cap 10 used inside a propeller shaft assembly during a vehicle crash. During the impact, a force 54 acting on the vehicle transmission shifts the stub shaft 16, producing displacement in the direction shown by the arrow. The internal joint components 14 abut the cap 10 and push it toward the tubular propeller shaft 58, thereby separating the rib 60 from the indentation 30 with a force 54 exceeding a first force threshold set for the retention capabilities of the interference fit between the rib 60 and the indentation 30. The perimeter of the first radial wall 34, acting as a low force retention feature, contacts the interior bead of the weld 56.

After the perimeter of the second radial wall 36 of the cap 10 abuts the bead of the weld 56, the walls may collapse upon exceeding a second force threshold as shown in FIG. 10. This collapse leaves the webbed first radial wall 34 of the cap 10 intact.

Upon exceeding a third force threshold, the rim 26 of the cap 10 may be retained inside the CVJ outer race 12. The central portion of the cap 10 may shear away, separating from the rim 26, and allow the internal joint components 14 to escape from the outer race 12 into the tubular propeller shaft 58. The rim 26 remains in contact with the weld 56, while the impact causes the central portion of the cap 10 to shear and break away. The central portion exits the outer race 12 ahead of the internal joint components 14 and enters the tubular propeller shaft 58, giving way for the internal joint components 14 to follow.

The first force threshold is set to be lower than the second force threshold, which in turn is lower than the third force threshold to ensure a proper order of events: displacement, wall collapse, and rim separation.

Alternatively, the rim 26 may break into pieces that may disperse inside the tubular propeller shaft 58 as illustrated in FIG. 11. In FIG. 11, the stub shaft 16 has been pushed so far into the tubular propeller shaft 58 that the dust boot 24 is torn. The rim 26 of the cap 10 is destroyed and broken into many small pieces dispersed in the tubular propeller shaft 58. The pieces are small enough not to impede the movement of the internal joint components 14. In the example of FIG. 11, the third force threshold determines the disintegration of the rim 26 and optionally also the central portion of the cap 10.

The cap 10 is made of a material with a limited elasticity on the one hand, but tunable to move and to collapse under predetermined forces 54 produced by the vehicle during a crash on the other hand. The exact energies and resulting forces 54 to trigger the displacement, the collapse of the walls, and breaking of the cap 10 can be empirically determined and depend on several factors that may include vehicle weight and spatial dimensions inside the vehicle.

The internal joint components 14 are small enough to pass from the outer race 12 through the tubular propeller shaft 58 following a backward shift of an engine or transmission during a vehicle collision, to absorb the energy created by the vehicle collision, thereby enabling the longitudinal collapse described earlier.

FIG. 12 shows a propeller shaft assembly, in which the outer race 12 has been attached to the tubular by a different process that leaves a smooth surface at the inner diameter along the transition from the outer race 12 to the tubular propeller shaft 58. Such a smooth transition is, for example, attained by a gas metal arc weld or magnetic arc weld forming. The cap 10 may be made with a diameter small enough such that it is able to pass through the weld portion and into the tubular propeller shaft 58. Accordingly, absent an interior weld bead, the grease retention and vent cap 10 may remain intact during the collision. The cap 10 of FIG. 12 simply moves to the right as a whole, ahead of the internal CVJ components, without shearing of the cap 10.

If the CVJ and tubular propeller shaft 58 are connected by a process other than friction welding, such as a magnetic arc welding or gas metal arc welding, no interior bead is created. In this approach, the cap 10 may be small enough to pass through the connection between the CVJ and the tubular propeller shaft 58 into the tubular propeller shaft 58 during a collision, without breaking the cap 10.

The cap 10 is dimensioned to be sufficiently robust to withstand general handling and operation during normal use over the entire lifetime of a propeller shaft, but to break in the intended locations upon exertion of an axial force 54 exceeding the second and third force thresholds, respectively.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are inside the scope of the invention as determined by the appended claims when interpreted in accordance with the breadth to which they are fairly, legally, and equitably entitled.

What is claimed is:

1. A grease-retention assembly for a drive shaft assembly having a tubular shaft connected to a joint with an outer race and internal joint components, the grease-retention assembly comprising the outer race and a cap for grease retention and venting arranged in an inside diameter section of the outer race,
    the cap including
    an outer annular rim with an annular indentation having a semi-elliptical or semi-circular cross-section; and
    the outer race including a radial annular rib extending from the inside diameter section, the rib partially filling the annular indentation of the outer annular rim when the cap is in an axial end position, the rib having an asymmetrical profile with a first axial portion forming a ramp and a second axial portion opposite the first axial portion forming a stop surface, the stop surface forming a larger angle with respect to an axial direction than the ramp.

2. A joint assembly comprising a grease-retention assembly for a drive shaft assembly having a tubular shaft connected to a joint with an outer race and internal joint components, the grease-retention assembly including
    the outer race and a cap for grease retention and venting arranged in an inside diameter section of the outer race,
    the outer race including a radial annular rib extending from the inside diameter section, the rib partially filling an annular indentation of an outer annular rim when the cap is in an axial end position, the rib having an asymmetrical profile with a first axial portion forming a ramp and a second axial portion opposite the first axial portion forming a stop surface, the stop surface forming a larger angle with respect to an axial direction than the ramp,
    and further a stub shaft, an inner race, a cage, and balls of a constant velocity joint.

3. The joint grease-retention assembly according to claim 2, wherein the annular indentation has a semi-elliptical or semi-circular cross-section.

4. The joint assembly according to claim 2, wherein the rib has a radially innermost ridge engaging the annular indentation of the rim in an interference fit.

5. The joint assembly according to claim 4, wherein the annular indentation has a bottom with a bottom diameter of the cap and the ridge has an inner diameter that is smaller than the bottom diameter of the cap within the annular indentation before the cap is placed in the axial end position.

6. The joint assembly according to claim 2, wherein a radial abutment shoulder extends radially inward from the inside diameter section and defining the axial end position of the outer annular rim of the cap.

7. The joint assembly according to claim 6, wherein the ramp forms a convex arc with a curvature corresponding to a partial curvature of the annular indentation.

8. The joint assembly according to claim 6, wherein the first axial portion forming the ramp is arranged on the annular rib remote from the abutment surface and second axial portion forming the stop surface is arranged proximate the abutment surface.

9. The joint assembly according to claim 2, wherein the annular indentation and the annular rib are dimensioned to hold the cap unmoved until an axial force acting on the cap in a direction away from the radial abutment shoulder exceeds a predetermined threshold.

10. The joint assembly according to claim 2, wherein the cap consists of plastic and the outer race consists of metal.

11. A drive shaft assembly comprising the joint assembly of claim 2 and a tubular shaft fixedly connected to the outer race.

12. A grease-retention assembly for a drive shaft assembly having a tubular shaft connected to a joint with an outer race and internal joint components, the grease-retention assembly comprising
    the outer race and a cap for grease retention and venting arranged in an inside diameter section of the outer race,
    the outer race including a radial annular rib extending from the inside diameter section, the rib partially filling an annular indentation of an outer annular rim when the cap is in an axial end position, the rib having an asymmetrical profile with a first axial portion forming a ramp and a second axial portion opposite the first axial portion forming a stop surface, the stop surface forming a larger angle with respect to an axial direction than the ramp,
    wherein the cap further comprises
    a central portion having a hollow air cavity extending across the cap between two radially extending walls,
    an axial hole leading from the air cavity to the outside of the cap through one of the two radially extending walls, and
    a radial annular groove communicating with the air cavity.

13. The grease-retention assembly according to claim 12, wherein the hollow air cavity of the central portion of the cap includes interior walls connecting the radially extending walls and forming a labyrinth of interconnected channels.

14. The grease-retention assembly according to claim 13, wherein the interconnected channels are in fluid communication with the annular groove.

15. The grease-retention assembly according to claim 13, wherein the interior walls comprise two sets of walls, each of the two sets extending across half of the hollow air cavity, the interior walls of one of the two sets being laterally offset from the interior walls of the other set.

16. The grease-retention assembly according to claim 13, wherein the interior walls are parallel to each other and wherein each of the interior walls extends across a portion of the hollow air cavity, thereby preserving fluid communication among a plurality of channels between adjacent interior walls, the plurality of channels forming the interconnected channels.

17. The grease-retention assembly according to claim 13, wherein the axial hole has an outer boundary and the interior walls are arranged outside of the outer boundary of the axial hole.

18. The grease-retention assembly according to claim 12, wherein the axial hole is placed in a radially central location of the cap on the one of the two radially extending walls that faces the internal joint components.

19. The grease-retention assembly according to claim 12, wherein the outer annular rim sealingly contacts the inner inside diameter of the outer race.

\* \* \* \* \*